MAGNETIC SEQUENTIAL PULSE GENERATOR

Filed Feb. 14, 1963 2 Sheets-Sheet 1

INVENTOR.
PAUL E. LORENTZEN
BY
Dock N. Jeu
AGENT

MAGNETIC SEQUENTIAL PULSE GENERATOR

Filed Feb. 14, 1963 2 Sheets-Sheet 2

INVENTOR.
PAUL E. LORENTZEN
BY
Dock N. Jeu
AGENT 3,329,828
MAGNETIC SEQUENTIAL PULSE GENERATOR Paul E. Lorentzen, Pacific Palisades, Calif., assignor to Douglas Aircraft Company, Inc., Santa Monica, Calif.

Filed Feb. 14, 1963, Ser. No. 258,528
10 Claims. (Cl. 307—88)

My present invention relates generally to pulse generators and more particularly to a magnetic sequential pulse generator.

Transistor pulse generators basically involving a pair of transistors and a saturable transformer connected in a feedback arrangement have been commonly used to provide a square wave alternating voltage output from a direct voltage supply. These transistor pulse generators have the advantage of being relatively quite simple, have a very precise output frequency and are extremely reliable. A square wave signal can, of course, be used to provide a series of equally spaced pulses.

In order to obtain pulse output signals from respective and separate outputs successively in sequence, a ring counter or the like is generally employed. Such devices require a relatively large number of components and become increasingly unreliable with an increasing number of separate outputs.

It is a major object of my invention to provide a sequential pulse generator which is relatively simple in structure and is extremely reliable in operation.

Another object of this invention is to provide a sequential pulse generator having a highly precise output frequency or pulse repetition rate.

A further object of this invention is to provide a sequential pulse generator which has a large number of separate outputs but is simple of structure and is highly reliable, requiring minimum maintenance.

A still further object of the invention is to provide a sequential pulse generator which can provide either a sequential series of positive or negative output pulses.

Briefly, and in general terms, the foregoing and other objects are preferably accomplished by providing a magnetically coupled multivibrator including a multiple core, saturable transformer having primary and feedback windings wound around all of the cores, series connected bias windings preferably each with a successively increasing number of turns wound around their respective cores, and output windings wound around their respective cores. The output windings preferably have center taps which are connected to a common reference lead, and suitably oriented diodes are respectively connected to the ends are connected to a common reference lead, and suitably of the output windings to provide a plurality of outputs. The diodes can be conected in one direction for positive sequential output pulses and in another direction for negative sequential output pulses, relative to the common reference lead.

My invention will be more fully understood, and other objects and advantages thereof will become apparent from the following detailed description of an exemplary embodiment of the invention. This description should be taken in conjunction with the accompanying drawings, in which.

Figure 1:
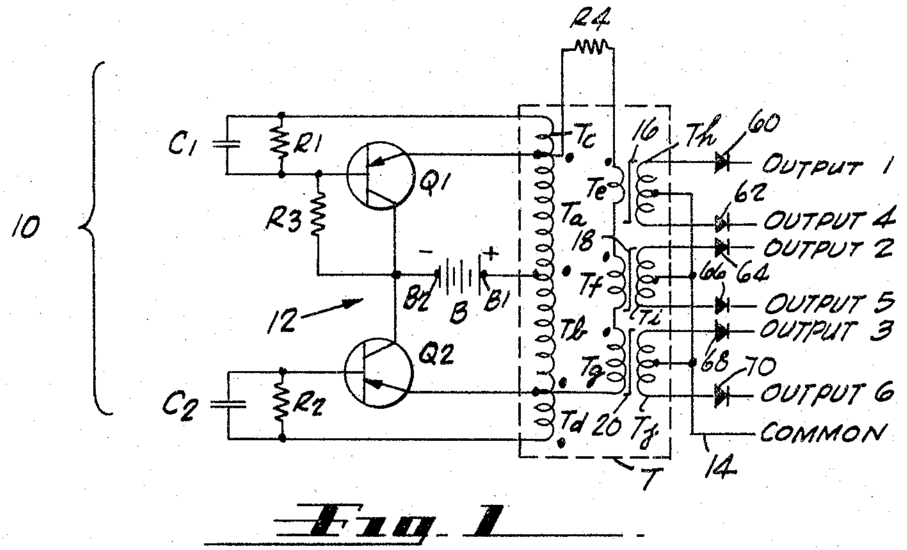
FIGURE 1 is a schematic circuit diagram of an illustrative embodiment of a sequential pulse generator constructed according to my invention.

FIGURE 1 shows a magnetic sequential pulse generator 10 including a saturable core transformer T. The pulse generator 10 produces outputs similar to a conventional ring counter, and operates on the principle that the voltage developed in an output winding (of transformer T) is proportional to the rate of flux change in the magnetic core on which the output winding is wound. The generator 10 is basically a magnetically coupled multivibrator 12 having a multiple core output transformer T. It has extremely high reliability and minimum maintenance is required for it. The pulse generator 10 is shown and described in one useful application in a copending patent application Ser. No. 258,719 filed February 15, 1963 by Paul E. Lorentzen and Darrell W. Tesdall for Static Inverter System.

The generator 10 which is illustratively shown in FIGURE 1 is for relatively low repetition rates or frequencies and relatively long output pulse widths or durations. However, much higher repetition rates or frequencies and much shorter pulse widths or durations can be easily obtained by use, for example, of small ferrite cores. The transformer T has three toroidal cores, for example, which are preferably stacked one on top of the other as schematically indicated in FIGURE 1. A single, separate output winding is wound around each of the cores and, additionally, a single bias winding is also wound around each of the cores but these bias windings are connected in series. The primary windings T*a* and T*b*, and the feedback windings T*c* and T*d* are each wound around the entire stack of cores. The common junction of the primary windings T*a* and T*b* is connected to the positive terminal B1 of a direct voltage source B, and the collectors or transistors Q1 and Q2 are connected to the negative terminal B2 as shown.

The common junction of primary winding T*a* and feedback winding T*c* is connected to the emitter of the transistor Q1, and the common junction of the primary winding T*b* and feedback winding T*d* is similarly connected to the emitter of the transistor Q2. The free end of the feedback winding T*c* is connected to the base of the transistor Q1 through a speed-up network including resistor R1 shunted by capacitor C1. Similarly, the free end of the feedback winding T*d* is connected to the base of the transistor Q2 through another speed-up network including resistor R2 shunted by capacitor C2. The base of the transistor Q1 is also connected to terminal B2 through start resistor R3.

The common junction between primary winding T*a* and feedback winding T*c* is connected to one end of bias winding T*e* through a limiting resistor R4. The other end of the bias winding T*e* is connected through bias winding T*f* to one end of bias winding T*g*, the other end of which is connected to the common junction between primary winding T*b* and feedback winding T*d*. As indicated in FIGURE 1, the bias windings have successively increasing numbers of turns which are increased by equal increments between successive bias windings.

For example, bias winding T*e* can have 10% of the number of turns of a primary winding, bias winding T*f* can have 20%, and bias winding T*g* can have 30%. Output windings T*h*, T*i* and T*j* have their center taps connected to a common lead 14, and are respectively wound on the same cores as the bias windings T*e*, T*f* and T*g*. Alternatively, the first bias winding T*e* can be completely eliminated so that bias winding T*f* can start with the 10% figure, and bias winding T*g* can be increased by the same increment for a 20% figure. The elimination of the first bias winding T*e* would remove any offsetting or displacing effect on the hysteresis loop for the first core, and the loop would be centered normally along the abscissa ampere-turn axis symmetrically on the ordinate flux axis.

The bias winding T*e* and output winding T*h* are wound on core 16, bias winding T*f* and output winding T*i* on core 18, and bias winding T*g* and output winding T*j* on core 20. The bias windings T*e*, T*f* and T*g* have successively increasing numbers of turns as mentioned above and indicated in FIGURE 1. The effect of such bias windings is to offset or displace the hysteresis loops progressively from the ordinate flux axis along the abscissa ampere-turn axis. The result is that outputs of the cores are progressively delayed and energized in sequence with increasing magnetizing current.

Figures 2, 3A, 3B, 3C:
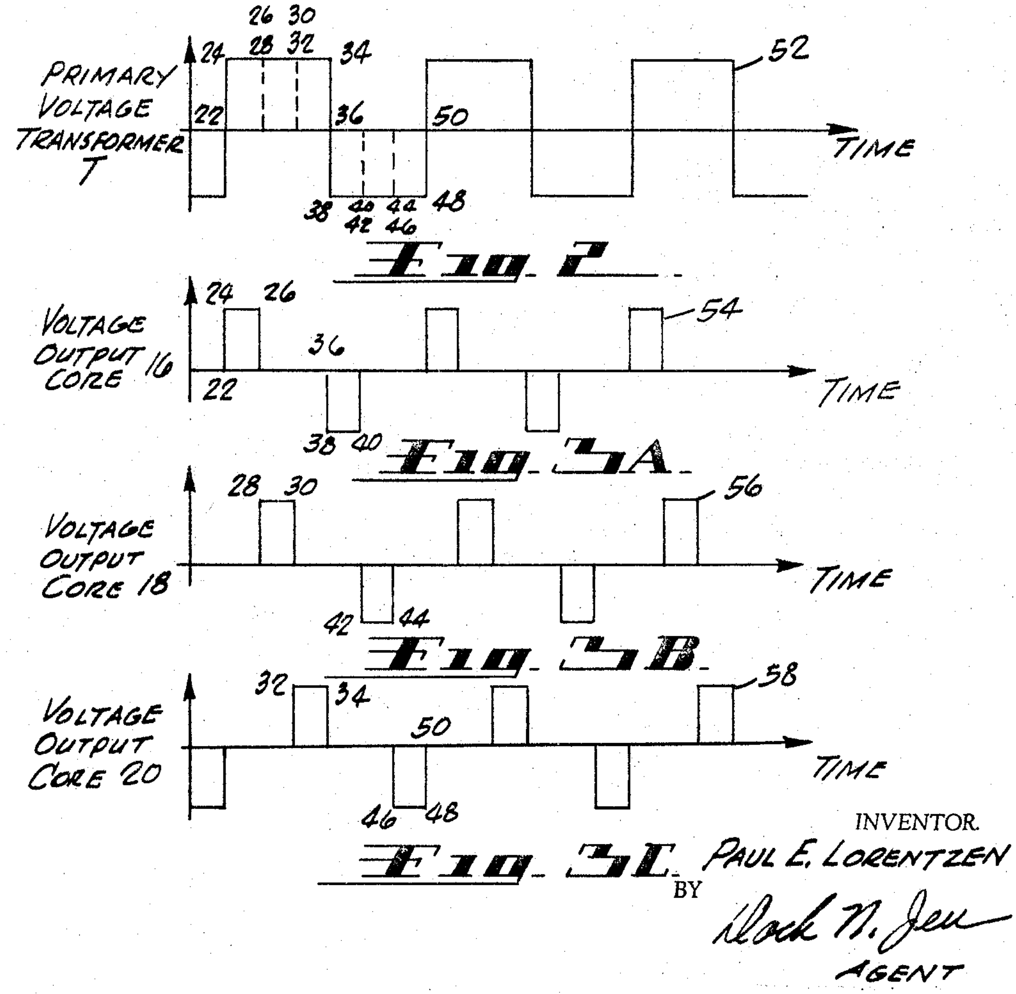
FIGURE 2 is a graph showing a plot of the primary voltage waveform for the saturable core transformer of the sequential pulse generator.
FIGURES 3A, 3B and 3C are graphs which illustrate the output voltage waveforms from the respective cores of the sequential pulse generator.

FIGURE 2 is a graph which is a plot of primary winding voltage produced by the multivibrator 12 versus time. This is the usual waveform produced in a magnetically coupled multivibrator as is well known. The various points 22, 24, 26, 28, 30, 32, 34, 36, 38, 40, 42, 44, 46, 48 and 50 indicated along the waveform 52 are provided to generally inter-relate the input voltage on the primary windings T*a* and T*b* of the transformer T with the hysteresis loops of the cores 16, 18 and 20 as explained below. It is noted that the displacement of the individual hysteresis loops by the bias windings do not effect operation on the primary side of the circuit since the voltage produced in the primary windings is equal to the sum of the voltages produced in the individual output windings times the turns ratio.

FIGURES 3A, 3B and 3C are graphs which illustrate the output signals from the cores 16, 18 and 20, respectively. As is evident from these figures, the various numbers interrelating the points on the hysteresis loops of cores 16, 18 and 20 with points along the waveform 52 in FIGURE 2 are also shown on certain of the pulses of the series of pulses 54, 56 and 58 in FIGURES 3A, 3B and 3C, respectively. The frequency of the square wave 52 is, for example, 400 c.p.s.

Figure 4:
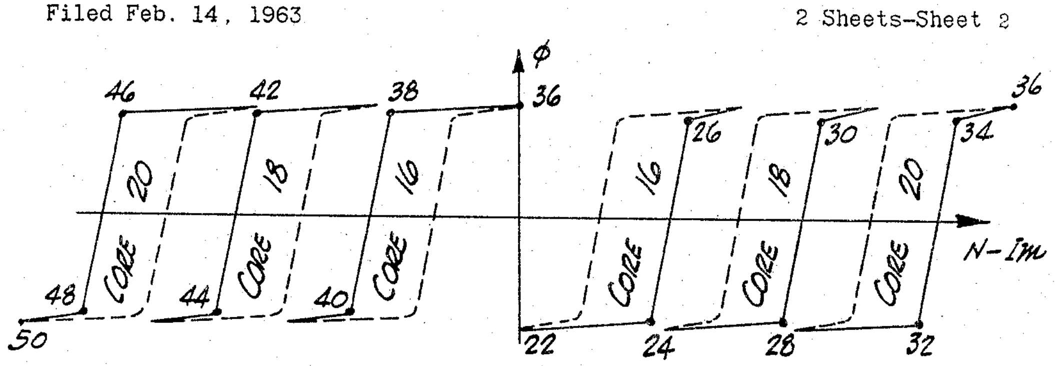
FIGURE 4 is another graph showing the effect of a successively increasing number of bias winding turns on the hysteresis loops of the multiple core transformer used in the sequential pulse generator.

FIGURE 4 is a graph in which flux $\phi$ is plotted against primary magnetizing ampere-turns N–I*m*, illustrating the effect of the bias windings on the hysteresis loops of each of the cores 16, 18 and 20. A positive bias current through the series bias windings T*e*, T*f* and T*g* would displace the hysteresis loops to the right of the flux ordinate axis, and a negative bias current resulting from a switch of conduction of the transistors Q1 and Q2 would displace the hysteresis loops for the cores 16, 18 and 20 to the left of the flux ordinate axis, as indicated in FIGURE 4. Positive output pulses, across an output winding, are produced for a positive magnetizing current I*m*, and negative output pulses are produced after the magnetizing current drops to zero and becomes sufficiently negative to overcome the effect of the then negative bias current. The magnitude of these output pulses across an output winding are, for example, 12 volts, or 6 volts relative to its center tap or the lead 14.

At point 22 in FIGURES 3A and 4, all of the cores 16, 18 and 20 are in negative saturation. As the magnetizing current I*m* builds up in a primary winding T*a*, for example, point 24 is reached and core 16 is driven out of saturation. Between points 24 and 26, the flux change in core 16 produces the first pulse of the series of pulses 54 shown in FIGURE 3A, and which appears in the output winding T*h* of the first core 16. As the magnetizing current continues to increase, core 16 is driven into positive saturation and point 28 is reached in core 18. Between points 28 and 30 the flux changes rapidly until positive saturation is reached in core 18. This flux change produces the first pulse of the series of pulses 56 shown in FIGURE 3B, and which appears in the output winding T*i* of the second core 18. This latter pulse is displaced 60 electrical degrees from the former pulse as taken with respect to the square wave 52.

Similarly, the third core 20 is finally driven from negative to positive saturation between points 32 and 34, producing the first positive pulse of the series of pulses 58 shown in FIGURE 3C. This pulse, of course, appears in the output winding T*j* of the third core 20, and is displaced 60 electrical degrees as indicated in FIGURE 2, from the first pulse of the series of pulses 56 of FIGURE 3B. At point 34, all of the cores 16, 18 and 20 are in positive saturation, and the magnetizing current I*m* rapidly builds up in the active primary winding T*a* of the multivibrator circuit causing transistor Q1 to drop out of saturation and start the normal sequence of events leading to the switching off of transistor Q1 and the switching on of the transistor Q2. At point 36, all winding voltages have dropped to zero, and the magnetizing current starts decaying and turns on the transistor Q2.

When the transistor Q2 is turned on, the polarity of the square wave 52 shown in FIGURE 2 is reversed, and the current polarity through the series connected bias windings T*e*, T*f* and T*g* is reversed which effectively switches the individual hysteresis loops from the right to the left side of the flux $\phi$ ordinate axis as indicated in FIGURE 4. Since the magnetizing current I*m* now builds up in the opposite direction, the cores 16, 18 and 20 are driven successively from positive to negative saturation, completing a cycle of events with the production in a similar manner as described above of the first negative pulses respectively following the first positive pulses shown in FIGURES 3A, 3B and 3C.

By means of suitably oriented output diodes connected to the ends of the output windings T*h*, T*i* and T*j*, the outputs of the pulse generator 10 are rectified to provide a sequence of positive pulses taken, of course, with reference to the common lead 14. As can be seen in FIGURE 1, output winding T*h* has two output diodes 60 and 62, the output winding T*i* has output diodes 64 and 66, and the output winding T*j* has output diodes 68 and 70. The outputs from diodes 60, 62, 64, 66, 68 and 70 are respectively identified as outputs 1, 4, 2, 5, 3 and 6.

FIGURES 5A, 5B, 5C, 5D, 5E and 5F are graphs which illustrate the respective series of output pulses from the outputs 1, 2, 3, 4, 5 and 6 of FIGURE 1. The several series of pulses 72, 74, 76, 78, 80 and 82 are produced from the outputs 1, 2, 3, 4, 5 and 6, respectively. As can be seen from FIGURES 5A through 5F, the first pulse of each series is displaced sequentially from output to output, the cycle then being repeated from output 6 back to output 1 and so forth. The start of a pulse from one output begins with the end of the pulse from a preceding output.

Figures 5A, 5B, 5C, 5D, 5E, 5F, 6:
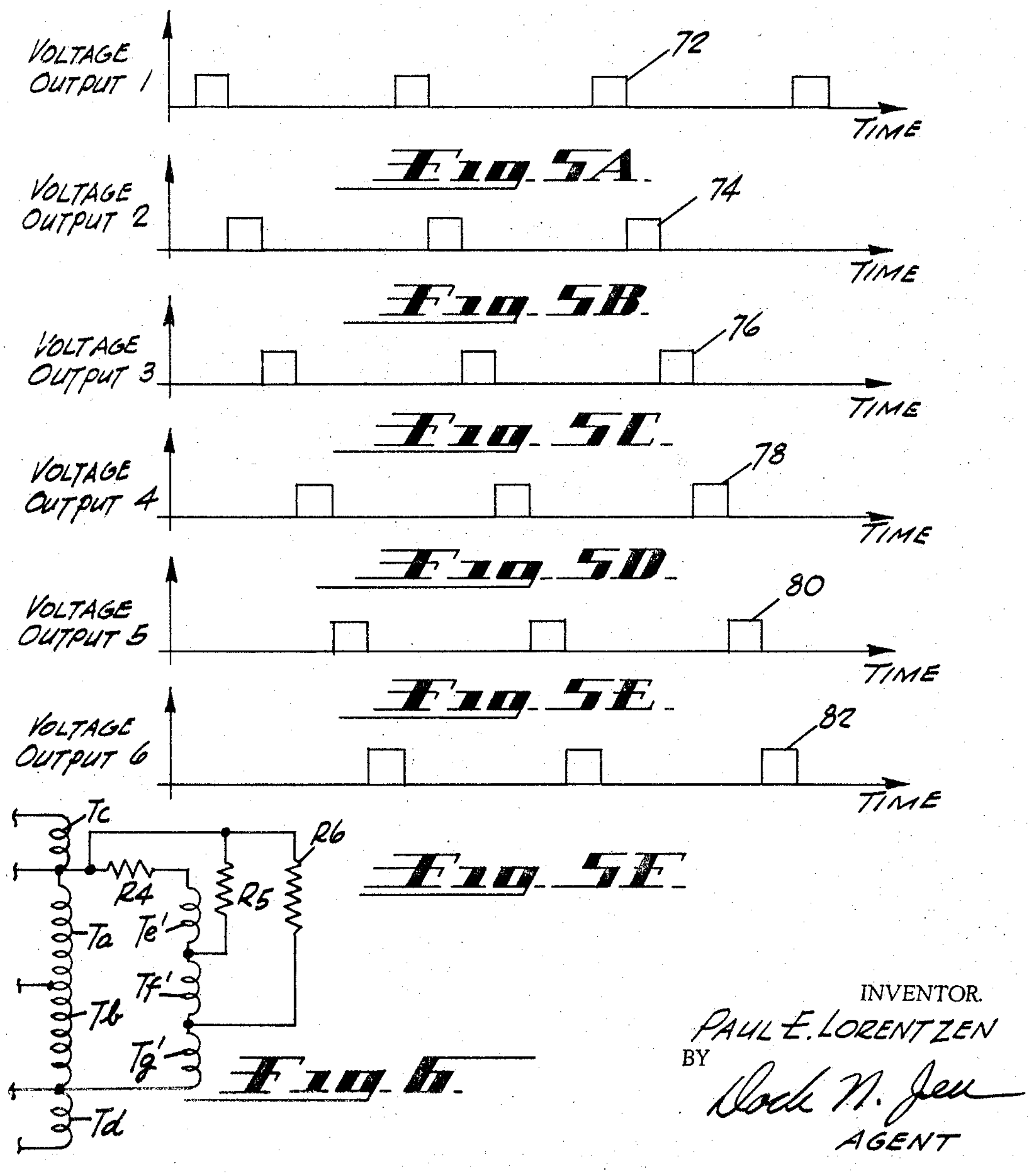
FIGURES 5A, 5B, 5C, 5D, 5E and 5F are graphs illustrating the output voltage waveforms from the different outputs of the sequential pulse generator.
FIGURE 6 is a fragmentary circuit diagram showing a variation in energization of bias windings for the respective cores of the sequential pulse generator.

FIGURE 6 is a fragmentary circuit diagram showing a variation of manner in which the series connected bias windings can be energized. Bias windings T*e*′, T*f*′ and T*g*′ correspond respectively to bias windings T*e*, T*f* and Tg. However, the bias windings T*e*′, T*f*′ and T*g*′ do not have successively increasing number of turns but, rather, have equal number of turns. Resistors R5 and R6 are added, and connect the upper end of the primary winding T*a* respectively to the common junctions between bias windings T*e*′ and T*f*′, and T*f*′ and T*g*′, as shown.

It is apparent from FIGURE 6 that while the number of turns on the bias windings T*e*′, T*f*′ and T*g*′ are equal, progressively increasing current flows through the successive bias windings T*e*′ T*f*′ and T*g*′ because of the resistors R5 and R6 which are connected in parallel with the resistor R4 to the same end of the primary winding T*a*. Thus, the ampere-turns are successively increased for the bias windings T*e*′, T*f*′ and T*g*′.

It is to be noted that the primary and feedback windings are preferably wound around all three cores 16, 18 and 20 which are stacked one on top of the other. However, each primary and feedback winding can be wound around each core and then are connected in series like the bias windings T$e$, T$f$ and T$g$. But this is obviously an undesirable and inefficient approach since three times the number of primary and feedback windings would be required. Of course, the number of primary winding turns, for example, can be varied for each core with separate primary windings to provide different output voltages, but the output voltages can also be varied by varying the number of turns of the output windings.

For separate core windings, three feedback windings similar to winding T$c$ would be wound around the three cores 16, 18 and 20, respectively, and then connected in series. Similarly, three primary windings similar to the winding T$a$ would be wound around their respective cores 16, 18 and 20 too, and then connected in series. These two series combinations of feedback and primary windings would then be connected in series in the same manner as the windings T$c$ and T$a$ are connected in FIGURE 1. Of course, this must be duplicated for the windings T$b$ and T$d$. The windings T$a$, T$b$, T$c$ and T$d$ would then be each replaced by three series connected windings which are wound around their respective cores 16, 18 and 20.

Whether the primary and feedback windings are each wound around all of the cores 16, 18 and 20, or three each of the primary and feedback windings are wound around their respective cores and then suitably connected in series is immaterial in that both arrangements are essentially the same functionally and are full equivalents of each other. Thus, the terms "feedback winding" and/or "primary winding" as used herein are understood to mean and cover either type of the above described arrangements of a winding wound around all of the cores, or windings wound around each of the cores and then connected in series.

The extreme simplicity of my magnetic sequential pulse generator 10 makes it especially useful for applications where high reliability and minimum maintenance are required. The outputs provided by the generator 10 are similar to that of a ring counter. Very high pulse repetition frequencies and narrower pulse widths can be obtained with small ferrite cores. Its precise output frequency lends itself ideally for many digital computer applications, for example.

It is to be understood that the exemplary embodiment of my invention described above and shown in the drawings is merely illustrative of, and not restrictive on, the broad invention, and that various changes in design, structure and arrangement may be made without departure from the spirit and scope of the appended claims.

I claim:

1. A magnetic sequential pulse generator, comprising:
a saturable, multiple core transformer including
- a plurality of saturable cores,
- a pair of primary windings each wound around said cores,
- a pair of feedback windings each wound around said cores,
- series connected bias windings adapted to be energized by said primary windings and of successively increasing ampere-turns respectively provided on each core except the first, and
- an output winding for each core;

a source of direct current; and
a pair of transistors, said source and transistors being adapted to be connected to said primary and feedback windings in a multivibrator circuit.

2. A magnetic sequential pulse generator, comprising:
a saturable, multiple core transformer including
- a plurality of saturable cores,
- a pair of primary windings each wound around said cores,
- a pair of feedback windings each wound around said cores,
- series connected bias windings adapted to be energized by said primary windings and wound on respective cores with successively increasing ampere-turns of a predetermined increment over the ampere-turns of the bias winding on a preceding core, and
- an output winding for each core;

a source of direct current; and
a pair of transistors, said source and transistors being adapted to be connected to said primary and feedback windings in a multivibrator circuit.

3. A magnetic sequential pulse generator, comprising:
a saturable, multiple core transformer including
- a plurality of saturable cores,
- a pair of primary windings each wound around said cores and connected in series,
- a pair of feedback windings each wound around said cores,
- a plurality of bias windings wound around their respective cores and connected in series with free ends adapted to be connected to respective free ends of said series connected primary windings, and
- a plurality of output windings wound around their respective cores;

a source of direct current; and
a pair of transistors, said source and transistors being adapted to be connected to said primary and feedback windings in a multivibrator circuit.

4. A magnetic sequential pulse generator as defined in claim 3 wherein said bias windings are equal in number to said cores and are wound around their respective cores in successively increasing number of turns.

5. A magnetic sequential pulse generator as defined in claim 3 wherein said cores exceed in number said bias windings by at least one and said bias windings are wound around their respective cores in successively increasing number of turns.

6. A magnetic sequential pulse generator, comprising:
a saturable, multiple core transformer including
- a plurality of saturable cores,
- a pair of primary windings each wound around said cores and connected in series,
- a pair of feedback windings each wound around said cores and respectively connected in series with a free end of said series connected primary windings,
- a plurality of bias windings wound around their respective cores and connected in series with free ends adapted to be connected to respective common junctions between said primary windings and said feedback windings, and
- a plurality of output windings wound around their respective cores;

a source of direct current; and
a pair of transistors, said source and transistors being adapted to be connected to said primary and feedback windings in a multivibrator circuit.

7. A magnetic sequential pulse generator as defined in claim 6 wherein said bias windings are equal in number to said cores, and said bias windings are wound about their respective cores in successively increasing number of turns.

8. A magnetic sequential pulse generator as defined in claim 6 wherein said cores exceed in number said bias windings by at least one, and said bias windings are wound about their respective cores in successively increasing number of turns.

9. A magnetic sequential pulse generator, comprising:
a saturable, multiple core transformer including
- a plurality of saturable cores,
- a pair of primary windings each wound around said cores and connected in series,
- a pair of feedback windings each wound around said cores and respectively connected in series with a free end of said series connected primary windings,
- a plurality of bias windings wound around their respective cores and connected in series, and a plurality of output windings wound around their respective cores;

a resistor connecting a free end of said series connected bias windings to a common junction between a primary winding and a feedback winding, the other free end being connected to the other common junction between the other primary winding and the other feedback winding;

a source of direct current; and a pair of transistors, said source and transistors being adapted to be connected to said primary and feedback windings in a multivibrator circuit which produces a substantially alternating square wave signal to said primary windings.

10. A magnetic sequential pulse generator as defined in claim 9 including additional resistors respectively connecting the common junctions between said series connected bias windings to the same common junction between the primary winding and the feedback winding having the resistor connecting the free end of said series connected bias windings thereto.

References Cited

UNITED STATES PATENTS

| | | | |
|---|---|---|---|
| 3,087,073 | 4/1963 | Brewster ------------ | 307—88 |
| 3,174,050 | 3/1965 | Brewster et al. ------- | 307—88 |

BERNARD KONICK, *Primary Examiner.*

G. LIEBERSTEIN, S. M. URYNOWICZ, *Assistant Examiners.*